US010421916B2

United States Patent
Cowart et al.

(10) Patent No.: US 10,421,916 B2
(45) Date of Patent: Sep. 24, 2019

(54) SYSTEM FOR PRODUCING AN AMERICAN PETROLEUM INSTITUTE STANDARDS GROUP III BASE STOCK FROM VACUUM GAS OIL

(71) Applicants: Benjamin Cowart, Houston, TX (US); David Peel, Houston, TX (US); Frank Lappin, Homewood, IL (US); James Craig Smith, Columbus, OH (US)

(72) Inventors: Benjamin Cowart, Houston, TX (US); David Peel, Houston, TX (US); Frank Lappin, Homewood, IL (US); James Craig Smith, Columbus, OH (US)

(73) Assignee: Vertex Energy, Houston, TX (US)

( * ) Notice: Subject to any disclaimer, the term of this patent is extended or adjusted under 35 U.S.C. 154(b) by 0 days.

(21) Appl. No.: 16/201,070

(22) Filed: Nov. 27, 2018

(65) Prior Publication Data

US 2019/0161690 A1    May 30, 2019

Related U.S. Application Data

(60) Provisional application No. 62/593,002, filed on Nov. 30, 2017, provisional application No. 62/593,030, filed on Nov. 30, 2017.

(51) Int. Cl.
*C10G 49/22*    (2006.01)

(52) U.S. Cl.
CPC .................. *C10G 49/22* (2013.01)

(58) Field of Classification Search
CPC ......... C10G 45/00; C10G 45/02; C10G 49/22
See application file for complete search history.

(56) References Cited

U.S. PATENT DOCUMENTS

| | | | | |
|---|---|---|---|---|
| 5,976,354 A * | 11/1999 | Powers | ............... | C10G 65/043 208/212 |
| 6,787,026 B2 * | 9/2004 | Farshid | ................ | C10G 65/12 208/100 |
| 2004/0045870 A1 * | 3/2004 | Wrisberg | ............. | C10G 49/00 208/59 |

* cited by examiner

*Primary Examiner* — Randy Boyer
*Assistant Examiner* — Juan C Valencia
(74) *Attorney, Agent, or Firm* — Nolte Intellectual Property Law Group (57) ABSTRACT

A system for producing an American Petroleum Institute Standards Group III Base Stock from vacuum gas oil, by injecting hydrogen, heating, saturating the mixture through hydrogen reactors connected in series with a liquid hourly space velocity $(LHSV)^{-1}$ of from 0.5 to 2.5, forming a saturated heated base oil, and coproduct. The system fractionates the saturated heated base oil to while simultaneously refluxing a cooled fuel oil fraction forming an American Petroleum Institute Standards Group III Base Stock with less than 0.03% sulfur, with greater than 90% saturates and a viscosity index greater than 120 as defined by ASTM D-2270, a viscosity from 2 to 10 centistokes as defined by ASTM D-445 a boiling range from 600 degrees F. to 1050 degrees F., and a cold crank viscosity (CCS) between 1200 and 5000 centipoise at −25 degrees C. and as defined by ASTM D-5293.

5 Claims, 5 Drawing Sheets

SYSTEM FOR PRODUCING AN AMERICAN PETROLEUM INSTITUTE STANDARDS GROUP III BASE STOCK FROM VACUUM GAS OIL

CROSS REFERENCE TO RELATED APPLICATIONS

The application claims the benefit of related patent application of U.S. patent application Ser. No. 62/593,002 titled "System for producing an American Petroleum Institute Standards Group III Base Stock from vacuum gas oil" and U.S. patent application Ser. No. 62/593,030 Method for Producing an American Petroleum Institute Standards Group III Base Stock from vacuum gas oil" both filed Nov. 20, 2017 and incorporated herein in their entirety.

FIELD

The present embodiment generally relates to a system for producing an American Petroleum Institute Standards Group III Base Stock from vacuum gas oil.

BACKGROUND

A need exists for a system for producing an American Petroleum Institute Standards Group III Base Stock from vacuum gas oil.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

The invention teaches a system of producing an American Petroleum Institute Standards Group III Base Stock from used oil in the form of vacuum gas oil.

The embodiments will enable an increase in inventory of American Petroleum Institute Standards Group III Base Stock.

The embodiments will save lives because re-refining reduces unnecessary air pollution caused by burning used oil in space heaters which are not adequately maintained.

The embodiments reduce environmental pollution by providing a safe and responsible way to manage used oils. One gallon of used oil can contaminate over one million gallons of drinking water. Additionally, re-refining used oil requires between 50%-80% less energy to produce base oil compared to conventional production from crude oil.

The embodiments reduce dependence on fossil fuel because used oil can be beneficially re-refined to produce high-purity base oil fit for original purpose.

The embodiments create a base oil needed for high performance engines which require better fuel economy and lower emissions of Green House Gases and particulate matter. The resultant improvement in ambient air quality reduces negative health impacts, especially to the most vulnerable population—older citizens and young children.

The embodiments increase inventory of American Petroleum Institute Standards Group III Base Stock.

The embodiments reduce pollution to the improper disposal of used oil into ground water. 1 gallon of used oil can contaminate 1 million gallons of drinking water.

Before explaining the present system in detail, it is to be understood that the system is not limited to the particular embodiments and that it can be practiced or carried out in various ways.

The invention relates to a system for producing an American Petroleum Institute Standards Group III Base Stock from vacuum gas oil by simultaneously receiving a petroleum derived product, having a viscosity index greater than 120 and a vacuum gas oil.

The invention relates to a system for producing an American Petroleum Institute Standards Group III Base Stock from vacuum gas oil by three equipment arrangements.

In all three sequences, hydrogen is injected using two different injectors into a vacuum gas oil or mixture of vacuum gas oil and petroleum derived product, the hydrogen increasing pressure on the mixture to between 1000 psig and 1500 psig.

A series of heaters are then used to increase temperature of the mixture or of the vacuum gas oil to 600 degrees Fahrenheit, saturating the vacuum gas oil through a plurality of hydrogen reactors connected in series having a liquid hourly space velocity $(LHSV)^{-1}$ through the hydrogen reactors from 0.5 to 2.5, forming a saturated heated base oil, a coproduct and contaminants.

A fractionation tower receives and fractionates the heated saturated heated base oil to remove a light oil fraction with a boiling point of less than 600 degrees Fahrenheit while simultaneously refluxing a cooled light oil fraction during fractionating, forming an American Petroleum Institute Standards Group III Base Stock with less than 0.03 percent sulfur, greater than 90 percent saturates and a viscosity index greater than 120 as defined by ASTM D-2270 and a viscosity range from 2 centistokes to 10 centistokes as defined by ASTM D-445 with a boiling range from 600 degrees Fahrenheit to 1050 degrees Fahrenheit as defined by ASTM D-86, and a cold crank viscosity (CCS) from 1200 to 5000 centipoise at minus 25 degrees Celsius and as defined by ASTM D-5293.

Hydrogen is injected using two different injectors into the mixture increasing pressure on the mixture between 1200 psig and 1500 psig.

A first heater is used to increase temperature to 450 degrees Fahrenheit and 1200 psig on the mixture saturating the vacuum gas oil mixture through a plurality of hydrogen reactors connected in series having a liquid hourly space velocity $(LHSV)^{-1}$ through the hydrogen reactors from 0.5 to 2.5, forming a saturated heated base oil a coproduct and contaminates.

Multiple additional heaters and multiple additional hydrogen reactors are used in series.

The following terms are used herein:

ASTM D445-17a: American Society for Testing and Materials (ASTM) D445-17(a) published on May 1, 2017 is the standard method for testing kinematic viscosity of petroleum products both transparent and opaque liquids. Results are reported in cPs at 40° C. and 100° C.

ASTM D-2270-10: American Society for Testing and Materials (ASTM) D 2270-10 published on Jan. 1, 2016 is the standard method for calculating viscosity index (VI) of petroleum products from kinematic viscosities reported at 40° C. and 100° C.

ASTM D5293-17a: American Society for Testing and Materials (ASTM) D5293-17(a) published on Oct. 1, 2017 is the standard test to determine the apparent viscosity of engine oils and base oils at temperatures between minus 5 and minus 35° C. at high shear rates. Reported as dynamic or absolute viscosity, centipoise (cP).

ASTM D86-18: American Society for Testing and Materials (ASTM) D86-17 published on May 1, 2017 is the standard test to determine the distillation range of Petroleum Products and Liquid Fuels at Atmospheric pressure.

The term "conduit" as used herein is a channel for conveying fluids. Also referred to as a mixing conduit when multiple fluids are combined The term "Cold Crank Simulation" refers to a method used to determine the low temperature performance of lubricants, when starting a cold engine (i.e. cold-cranking, which physical property is termed "cold crank viscosity").

The term "contaminants" as used herein can comprise aromatics as well as compounds containing sulfur, nitrogen and chlorine, such as hydrogen sulfide (H2S), ammonia (NH3) or hydrochloric acid (HCL).

The term "contaminant free saturated heated base oil" refers to a saturated heated based oil after contaminants have been removed in the low pressure flash drum.

The term "control meters" are precision made liquid measuring instruments that maintain precise and accurate metering of fluids.

The term "control valve" is a valve used to control fluid flow by varying the size of the flow passage as directed by a signal from a controller. This enables the direct control of flow rate and the consequential control of process quantities such as pressure, temperature, and liquid level.

The term "coproduct" as used herein can refer to a saleable, light oil fraction created during the saturation of the heated vacuum gas oil mixture. The term "Group III base stock" is defined by the American Petroleum Institute as a base stock that is greater than 90 percent saturates, less than 0.03 percent sulfur and has a viscosity index above 120.

The term "cracked gas" as used herein refers the small percentage of very light hydrocarbons, usually existing in a gaseous form, which are a result of the breakdown of more complex, long-chain hydrocarbons such as vacuum gas oil and saturated, heated base oil.

The term "demetalizing catalyst" refers to a catalyst designed to selectively reduce specific metals such as phosphorous which may otherwise deposit on downstream catalysts, poisoning the active sites.

The term "flash drum" is a vessel used to separate a vapor-liquid mixture. A flash drum may also be referred to as a vapor-liquid separator, breakpot, knock-out drum or knock-out pot, compressor suction drum. It can operate at high pressure or low pressure.

The term "fractionation tower" is an essential item used in distillation of liquid mixtures so as to separate the mixture into its component parts, or fractions, based on the differences in volatilities.

The term "a fuel oil fraction" as used herein can refer to a light hydrocarbon, such as kerosene.

The term "heater" and/or "heating system" as used herein refers to the system or device that produces and radiates heat to raise the temperature of a liquid, gas or mixture. Examples may include direct fired heaters, heat exchangers of various styles, feed effluent heat exchangers, hot oil heaters, heater coils and such.

The term "heating the vacuum gas oil mixture" as used herein can refer to increasing an initial temperature of the vacuum gas oil mixture to at least 450 degrees, such as using an exchanger or a direct fired heater.

The term "hydrogen compressor" is a mechanical device that increases the pressure of hydrogen gas by reducing its volume.

The term "hydrogen reactor" as used herein is a pressure vessel in which hydrogen is used in a catalytic chemical process to remove contaminants such as sulfur and nitrogen from refined petroleum products, such as vacuum gas oil.

The term "hydrogen vaporizer" is a device which vaporizes liquid hydrogen.

The term "initial boiling point" as used herein can refer to the recorded temperature of the first drop of distilled vapor that is condensed and falls from the end of a condenser during distillation as defined by ASTM D-86.

The term "injector" is a mechanical device that increases the pressure of a gas by reducing its volume.

The term "light oil fraction" as used herein can refer to a light hydrocarbon, such as kerosene.

The term "liquid hourly space velocity" is defined as the hourly feed rate flow divided by the volume of catalyst.

The term "liquid hydrogen" is the liquid (cryogenic) state of the element hydrogen.

The term "metallic catalyst" is a substance that contains various metals such as nickel, cobalt, molybdenum which are usually supported on a metal oxide base. Catalysis is the process of increasing the rate of a chemical conversion by adding a substance known as a catalyst, which is not consumed in the catalyzed reaction and can continue to act repeatedly. Different metal combinations may be used to achieve the desired reaction.

The term "mixture" as used herein can refer to a substance made by mixing other substances together which may be soluble.

The term "naptha" is a distillation product boiling in the approximate range 100-200° C. and containing aliphatic hydrocarbons: Naptha is found as a component of solvents, as well as Kerosene and Gasoline.

The term "petroleum derived product" refers to a product that includes wax and oil with a viscosity index greater than 120 and wherein the petroleum derived product has a viscosity from 2 to 10 centistokes at 100 degrees Celsius as defined by ASTM D-445, and a viscosity index (VI) from 120 to 160 as defined by ASTM D-2270.

The term "plurality of hydrogen reactors" as used herein can refer to two or more hydrogen reactors, such as from 2 to 6 hydrogen reactors connected in series with increasing temperature in each hydrogen reactor. Each hydrogen reactor can have a "reactor volume". The reactor volume can be the expressed quantity in cubic feet of catalyst that is contained by the hydrogen reactor for each of the plurality of hydrogen reactors. In some examples, the plurality of hydrogen reactors can each have identical reactor volumes.

The term "recycle nozzle" is a device which injects recycled hydrogen into a conduit.

The term "recycle overhead" refers to a recycled hydrogen stream.

The term "refluxing" as used herein can refer to a technique involving the condensation of vapors and the return of condensate to the system from which it originates.

The term "random packed tower" is a distillation tower (or column) that has both trays and packed section internals. This could be 4 trays and 3 packed sections The term "saturates" means the fraction that consists of nonpolar material including linear, branched, and cyclic saturated hydrocarbons (paraffins).

The term "saturated heated base oil" refers to a hydrocarbon chain that has been heated, and has had the double and triple bonds between its carbon atoms broken and replaced with single bonds and hydrogen atoms.

The term "saturating the heated vacuum gas oil mixture" as used herein can refer to removing at least 90 percent of aromatic hydrocarbons, and aromatic alkanes, including toluene, xylene, and benzene.

The term "turbulent flow" is defined as flow of a fluid in which its velocity at any point varies rapidly in an irregular manner.

The term "used oil" as used herein can refer to any oil, which is synthetic oil or derived from crude oil, that has undergone a process, such as use in an engine, machine or any other device, which breaks down the properties of the oil during heating and mechanical operation. A used oil can be an oil used as a lubricant, a coolant or a heat transfer media.

The term "vacuum gas oil" as used herein can refer to oils purified by vacuum distillation process. This definition refers to used oils.

The term "velocity" is a measure of the rate of motion of a body expressed as the rate of change of its position in a particular direction with time. It is measured in meters per second, miles per hour or feet per second.

The term "viscosity" is a measure of an oil's resistance to flow It governs the sealing effect of oils and the rate of oil consumption, as well as determines the ease with which machines may be started or operated under varying temperature conditions, particularly in cold climates.

The term "viscosity index" as used herein can refer to the rate of change of a fluid's viscosity with changes with temperature as defined by ASTM D-2270.

The term "water cooled exchanger/cooling water exchanger" is a cooling system to remove heat from processes or equipment. Heat removed from one medium is transferred to another medium, or process fluid. Most often, the cooling medium is water.

The invention relates to a system for producing an American Petroleum Institute Standards Group III Base Stock from vacuum gas oil.

The system includes a conduit receiving a petroleum derived product having a viscosity index greater than 120, the conduit receiving a vacuum gas oil forming a vacuum gas oil mixture with a combined boiling point range from 450 degrees F. to 1050 degrees Fahrenheit as defined by ASTM D-86.

The system also includes a first heater fluidly connected to the conduit and to a first hydrogen reactor 32 for increasing temperature of the vacuum gas oil mixture to a temperature from 450 degrees Fahrenheit to 600 degrees F., forming a heated vacuum gas oil mixture.

The system also includes a pump installed prior to the first heater, a fresh hydrogen injector and a recycle hydrogen injector simultaneously increasing pressure on the heated vacuum gas oil mixture from 50 psig to a pressure from 1000 psig and 1500 psig by injection of hydrogen.

The system includes a plurality of hydrogen reactors connected in series, having a liquid hourly space velocity (LHSV)$^{-1}$ through the hydrogen reactors from 0.5 to 2.5, for saturating the heated vacuum gas oil mixture forming a first partially saturated heated base oil then a fully saturated heated base oil with hydrogen from the second and third hydrogen reactors.

The system includes a high pressure flash drum connected to the plurality of hydrogen reactors connected in series to separate a saturated heated base oil from a recycle overhead at a high pressure from 1000 psig to 1500 psig.

The system includes a low pressure flash drum removing contaminants from the saturated heated base oil producing contaminant free saturated heated base oil.

The system includes a fractionation tower which receives contaminant free saturated heated base oil and steam to remove a light oil fraction with an initial boiling point less than 600 degrees F. while simultaneously refluxing, forming an API Standards Group III Base Stock with less than 0.03 percent sulfur, greater than 90 percent saturates and a viscosity index greater than 120 as defined by ASTM D-2270 and a viscosity range from 2 to 10 centistokes as defined by ASTM D-445 with a boiling range from 600 degrees F. to 1050 degrees F. as defined by ASTM D-86, and a cold crank viscosity (CCS) between 1200 and 5000 centipoise at minus 25 degrees C. and as defined by ASTM D-5293.

In embodiments the invention can also have a feed effluent heat exchanger to exchange energy from the American Petroleum Institute Standards Group III Base Stock is with the feedstock vacuum gas oil reducing temperature of the American Petroleum Institute Standards Group III base stock from 500 degrees Fahrenheit to 300 degrees Fahrenheit.

In embodiments, the invention can have a cooling water exchanger to receive warm American Petroleum Institute Standards Group III Base Stock from the feed effluent heat exchanger and cools 100 degrees Fahrenheit to 150 degrees Fahrenheit and then transfers the cooled American Petroleum Institute Standards Group III Base Stock to storage or transport.

In embodiments, the fresh hydrogen injector can have a nozzle that engages a flow control valve further in communication with a flow meter and a high pressure pump and a hydrogen vaporizer for receiving liquid hydrogen from a liquid hydrogen reservoir.

In embodiments, the invention can have a metallic catalyst installed in each of the hydrogen reactors, wherein the metallic catalyst is selected from at least one of the group including: cobalt, nickel, and molybdenum.

In embodiments, the recycle hydrogen injector can have a recycle nozzle, a recycle flow meter connected to the recycle nozzle in series, a hydrogen compressor connected to the recycle flow meter, a second stage knockout drum separating contaminated water, a first stage knockout drum separating contaminated water and naptha, a water cooled exchanger, a high pressure wash water injector providing a psig from 1400 to 1600 psig receiving water, and a recycle overhead connected to the high pressure wash water injector.

Figure 1:
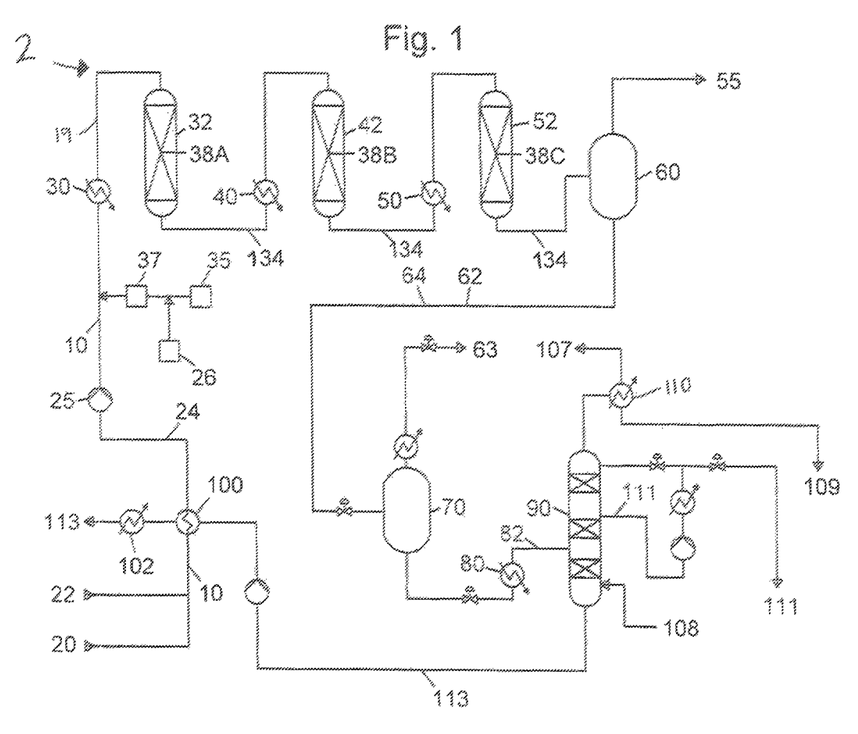
FIG. 1 is a diagram of the overall system for the production of American Petroleum Institute Standards Group III base stock from used oil.
Figure 2:
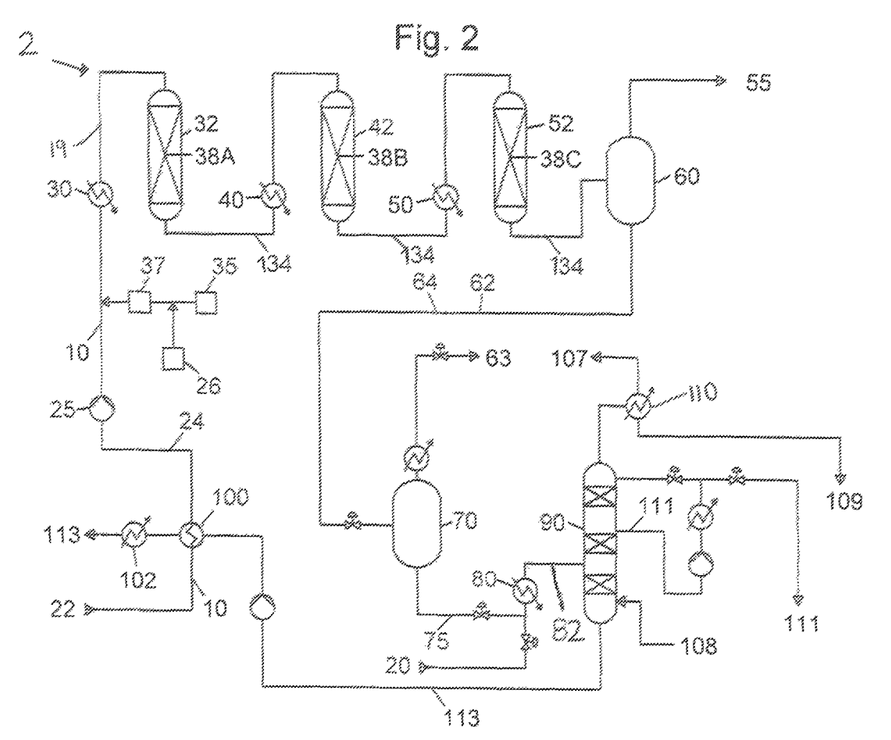
FIG. 2 is a diagram of another embodiment of the overall system for producing American Petroleum Institute Standards Group III base stock from used oil.
Figure 3:
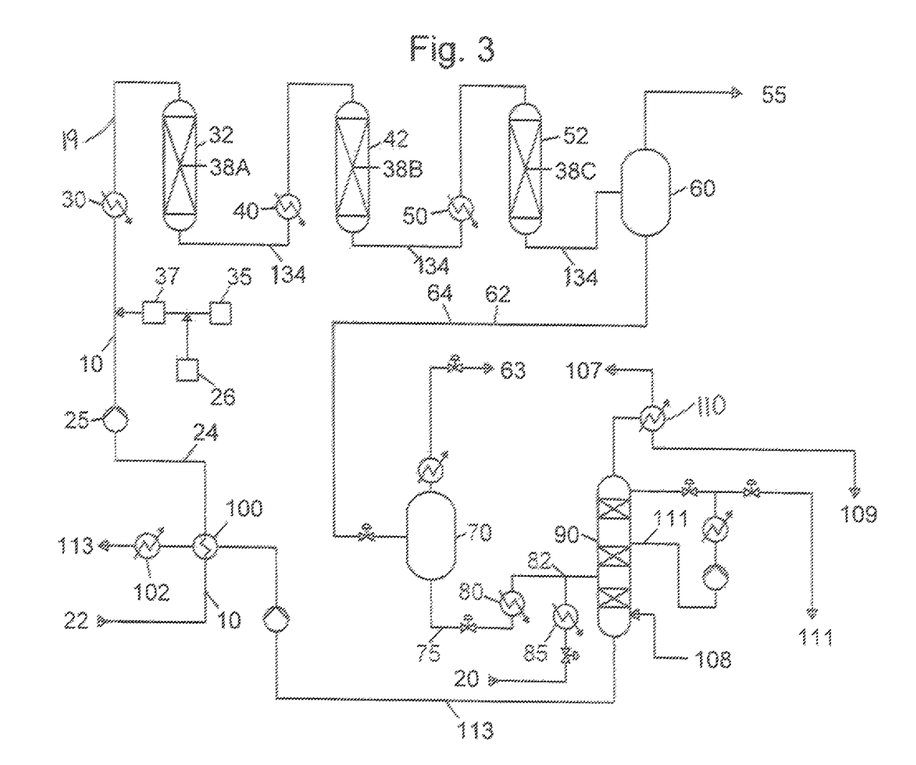
FIG. 3 is a diagram of yet another embodiment of the overall system for producing American Petroleum Institute Standards Group III base stock from used oil.

Turning now to the Figures, FIG. 1-FIG. 3 are diagrams of the overall system for the production of American Petroleum Institute Standards Group III base stock 113 from vacuum gas oil.

The system uses a fresh hydrogen injector for injecting hydrogen into the vacuum gas oil mixture and raising pressure in the conduit to maintain a pressure between 1000 psig and 1500 psig.

The system also uses a recycle hydrogen injector introducing recycle hydrogen at an elevated pressure and raising pressure in the conduit to maintain a pressure between 1000 psig and 1500 psig on the vacuum gas oil mixture.

The system can have a conduit 10 for receiving a petroleum derived product 20 having a viscosity index greater than 120. The conduit 10 receives a vacuum gas oil 22 derived from used oil forming a vacuum gas oil mixture 24 with a combined boiling point range from 450 degrees Fahrenheit to 1050 degree Fahrenheit.

A first heater 30 can be fluidly connected to the conduit 10 and to a first hydrogen reactor 32 for increasing temperature on the vacuum gas oil mixture 24 to 450 degrees Fahrenheit and to a pressure of 1200 psig partially saturating the vacuum gas oil mixture 24 in embodiments, prior to the first heater 30, a pump 25 transfers vacuum gas oil mixture 24 to the first heater.

A heated vacuum gas oil mixture 19 is shown positioned right above the first heater 30.

A first hydrogen reactor 32 creates a partially saturated heated base oil 34. A second heater 40 can be fluidly connected to the first hydrogen reactor 32, and a second hydrogen reactor 42 can further increase temperature of the partially saturated heated base oil 34.

A third heater 50 can be fluidly connected to the second hydrogen reactor 42 and to a third hydrogen reactor 52, increasing temperature to a third temperature of 600 degrees Fahrenheit and to a third pressure of 1000 psig forming a saturated heated base oil 134.

In embodiments, a high pressure flash drum 60 can be connected to the third hydrogen reactor 52 for separating contaminates from the saturated heated base oil 62 and coproduct 64 at a high pressure from 1000 psig to 1500 psig.

A recycle overhead 55 can be connected to the high pressure flash drum 60, receiving high pressure recycle hydrogen and contaminates separated from the saturated heated base oil in the high pressure flash drum.

A low pressure flash drum 70 can be connected to the high pressure flash drum 60.

The low pressure flash drum 70 can have a psig from 40 psig to 60 psig decreasing pressure and temperature on the saturated heated base oil 62 and coproduct 64 removing contaminates 63.

In another embodiment, the system can use a mixing conduit 75 for receiving a petroleum derived product 20 (shown in FIG. 2) instead of receiving the petroleum derived product through the conduit 10 shown in FIG. 1. In this alternative embodiment shown in FIG. 2, the petroleum derived product 20 has a viscosity index greater than 120.

A fourth heater 80 can be fluidly connected to the low pressure flash drum 70 for heating the saturated heated base oil 62 and coproduct 64 forming a contaminant free saturated heated base oil 82, which is shown in FIGS. 1 and 3, having a boiling point from 600 degrees F. to 1050 degrees Fahrenheit as determined by ASTM D-86.

In embodiments, a fifth heater 85 can be used as shown in FIG. 3. The fifth heater preheats a petroleum derived product 20 having a viscosity index greater than 120 to a temperature between 400 degrees Fahrenheit and 600 degrees Fahrenheit prior to introducing the preheated petroleum derived product into the mixing conduit 75.

FIGS. 1-3 show a fractionation tower 90 a fractionation tower 90 receives contaminant free saturated heated base oil 82 and steam 108 to remove a light oil fraction 111 with an initial boiling point less than 600 degrees F. while simultaneously refluxing a cooled light oil fraction 111 during fractionating forming an American Petroleum Institute Standards Group III Base Stock 113 with less than 0.03 percent sulfur, greater than 90 percent saturates and a viscosity index greater than 120 as defined by ASTM D-2270 and a viscosity range from 2 to 10 centistokes as defined by ASTM D-445 with a boiling range from 600 degrees F. to 1050 degrees F. as defined by ASTM D-86, and a cold crank viscosity (CCS) from 1200 to 5000 centipoise at −25 degrees C. and as defined by ASTM D-5293.

The fractionation tower 90 removes steam 108 and a cracked gas 107.

The steam 108 flow out of the fractionation tower and is condensed in a condenser 110 into steam condensate 109.

In embodiments, energy from the American Petroleum Institute Standards Group III Base Stock is exchanged with the feedstock vacuum gas oil reducing temperature of the American Petroleum Institute Standards Group III base stock from 500 degrees Fahrenheit to 300 degrees Fahrenheit using a feed effluent heat exchanger 100.

A cooling water exchanger 102 receives warm American Petroleum Institute Standards Group III Base Stock 113 from the feed effluent heat exchanger 100 and reduces temperature from 300 degrees Fahrenheit to 150 degrees Fahrenheit, before transfer to storage or transport.

In embodiments, each hydrogen reactor increases the fluid contained therein in temperature at least 5 percent.

In embodiments, a metallic catalyst 38a-38c can be inserted in each of the hydrogen reactors, wherein the metallic catalyst is selected from at least one of the group consisting of: cobalt, nickel, and molybdenum.

In embodiments, high pressure flash drums or low pressure flash drums can be used for separation.

Also shown in FIGS. 1-3 are a recycle nozzle 37, a recycle hydrogen injector 35, and a fresh hydrogen injector 26.

Figure 4:
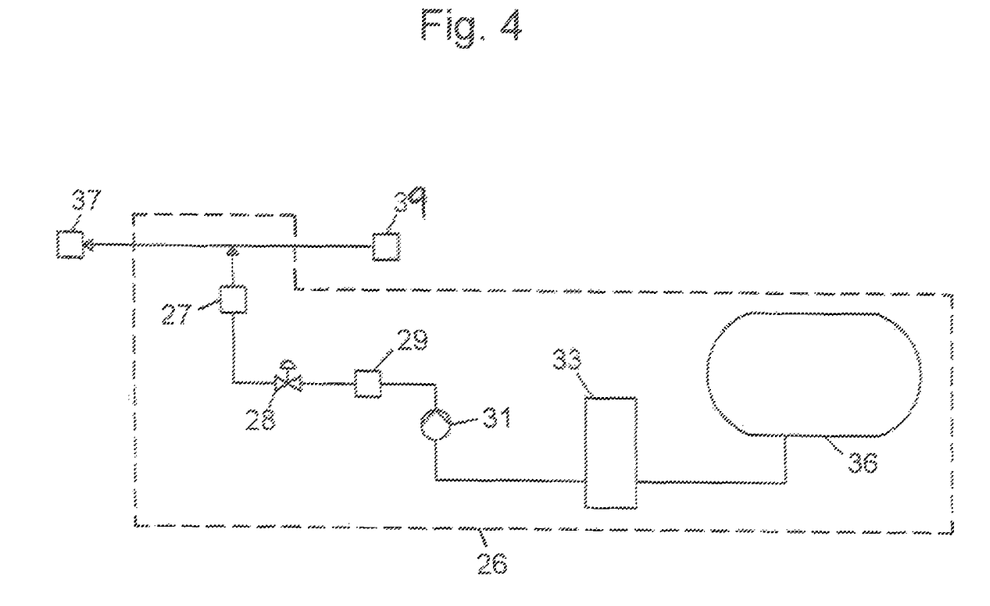
FIG. 4 is a diagram of the fresh hydrogen injector.

FIG. 4 a diagram of the fresh hydrogen injector 26.

A fresh hydrogen injector 26 can inject hydrogen and raise pressure in the conduit 10 to maintain between 1200 psig and 1500 psig on the vacuum gas oil mixture 24.

The fresh hydrogen injector 26 includes a nozzle 27 that engages a flow control valve 28 that is further in communication with a flow meter 29 and a high pressure pump 31 and a hydrogen vaporizer 33 for receiving liquid hydrogen from a liquid hydrogen reservoir 36.

In embodiments, a recycle flow meter 39 can be connected to the recycle nozzle 37 in series.

Figure 5:
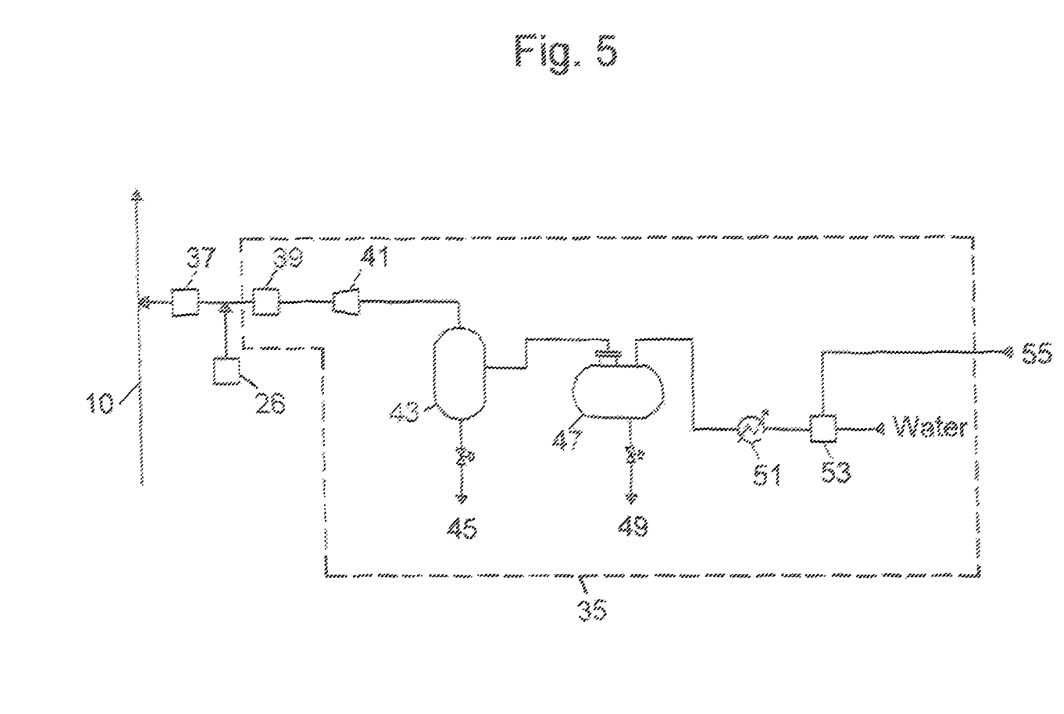
FIG. 5 is a diagram of the recycle hydrogen injector and associated components.

FIG. 5 is a diagram of the recycle hydrogen injector and associated components.

A recycle hydrogen injector 35 can inject recycled hydrogen at an elevated pressure and raise pressure on the vacuum gas oil mixture to maintain pressure in the conduit 10 between 1200 psig and 1500 psig.

The recycle hydrogen injector 35 includes a recycle nozzle 37, a recycle flow meter 39 connected to the recycle nozzle in series, a hydrogen compressor 41 connected to the recycle flow meter 39, a second stage knockout drum 43 separating out contaminated water 45, a first stage knockout drum 47 separating out contaminated water and naptha 49, a water cooled exchanger 51, a high pressure wash water injector 53 having a psig from 1400 psig to 1600 psig, and a recycle overhead 55 connected to the high pressure flash drum 60 receiving high pressure recycle hydrogen and contaminates 63 separated from oil in high pressure flash drum.

The fresh hydrogen injector 26 is also shown in this figure.

EXAMPLE 1

A system for producing an American Petroleum Standards Group III Base Stock from vacuum gas oil, can use a conduit 10 for receiving a petroleum derived product 20 having a viscosity index greater than 120.

The conduit can be a 2 inch inner diameter metal pipe.

The conduit receives a vacuum gas oil 22 derived from used oil forming a vacuum gas oil mixture 24 with a combined boiling point range from 450 degrees Fahrenheit to 1050 degree Fahrenheit as defined by ASTM D-86.

The conduit supports a turbulent flow in the pipe.

The flow rate in the conduit can be 45 gallons a minute.

A fresh hydrogen injector 26 can continuously inject high purity hydrogen into the conduit and raise pressure in the conduit 10 to maintain between 1200 psig and 1500 psig.

The fresh hydrogen injector can raise hydrogen partial pressure.

A recycle hydrogen injector 35 recirculates hydrogen from previous cycles in the system.

The recycle hydrogen injector increases velocity of the fluid in the conduit. It increases pressure by decreasing volume as the injector injects recycled hydrogen at an elevated pressure and raises pressure to maintain pressure in the conduit 10 between 1200 psig and 1500 psig.

A first heater 30 such as a heat transfer fluid hot oil heat exchanger fluidly connected to the conduit 10 and to a first hydrogen reactor 32 is used for increasing the vacuum gas oil mixture in temperature to 450 degrees Fahrenheit at 1000 psig to 1500 psig.

Hydrogen saturation occurs in the presence of a first catalyst in the first hydrogen reactor which can be nickel molybdenum, or cobalt supported on alumina beads. The heated vacuum gas oil mixture is fully saturated through a plurality of hydrogen reactors each with a similar or different catalyst, connected in series having a liquid hourly space velocity (LHSV)$^{-1}$ through the hydrogen reactors of from 0.5 to 2.5, forming a saturated heated base oil, a coproduct, and contaminates. In some embodiments, a demetalizing catalyst can be used in the first hydrogen reactors along with the first catalyst of with the nickel, cobalt or molybdenum catalyst.

A second heater 40 is fluidly connected to the first hydrogen reactor 32 and a second hydrogen reactor 42 having a second catalyst for further increasing in temperature of the vacuum gas oil mixture; saturating the heated vacuum gas oil mixture through a plurality of hydrogen reactors connected in series having a liquid hourly space velocity (LHSV)$^{-1}$ through the hydrogen reactors from 0.5 to 2.5; forming a saturated heated base oil, a coproduct, and contaminants.

A third heater 50 is fluidly connected to the second hydrogen reactor 42 and to a third hydrogen reactor 52 increasing the temperature of the vacuum gas oil mixture to a third temperature of 600 degrees Fahrenheit at a pressure between 1000 psig and 1500 psig.

The volume of the reactors can be 250 cubic feet with a cumulative total of all reactors of 750 cubic feet.

The heaters are on temperature control providing constant temperature to the hydrogen reactors.

A high pressure flash drum 60 connected to the third hydrogen reactor is used for separating remaining hydrogen and contaminates form the processed oil, which is known as the saturated heated base oil 62 and coproduct 64 at a high pressure from 1000 psig to 1500 psig.

The coproduct in this example with vacuum gas oil can be a light oil fraction similar to kerosene or diesel fuel.

Vacuum gas oil fluid is controlled to maintain a specific level of fluid in a low pressure flash drum 70 connected to the high pressure flash drum.

The low pressure flash drum 70 is used for decreasing the saturated heated base oil and coproduct pressure to between 40 to 60 psig.

A fourth heater 80 is fluidly connected to the low pressure flash drum heats the saturated base oil and coproduct, forming a contaminant free saturated heated base oil 82 having a boiling point from 600 degrees Fahrenheit to 1050 degrees Fahrenheit as determined by ASTM D-86. The fourth heater is similar to the first, second and third heaters.

A fractionation tower 90 is used that receives steam 108 and the contaminant free saturated heated base oil 82.

In this example a four tray, three packed bed section can be used. This is a randomly packed tower under vacuum.

The fractionation tower runs at about 2 psia continuously and can be 46 feet 9 inches feet tall. The diameter can be 5 feet 6 inches.

The flow rate through the fractionation tower is typically greater than 98% of the flow of vacuum gas oil mixture 24 in conduit 10, only decreasing by the amount of contaminants removed.

A cracked gas 107, generated during the fractionation process, is removed from the top of the tower, as shown in FIG. 1.

Steam 108 flows out the fraction tower via a conduit and is condensed into steam condensate 109 in the condenser 110.

A light oil fraction 111 is pulled off the tower refluxed and cycled back into the tower.

The fractionation tower 90 a fractionation tower 90 receives contaminant free saturated heated base oil 82 and steam 108 to remove a light oil fraction 111 with an initial boiling point less than 600 degrees F. while simultaneously refluxing a cooled light oil fraction during fractionating forming an American Petroleum Institute Standards Group III Base Stock with less than 0.03 percent sulfur, greater than 90 percent saturates and a viscosity index greater than 120 as defined by ASTM D-2270 and a viscosity range from 2 centistokes to 10 centistokes as defined by ASTM D-445 with a boiling range from 600 degrees Fahrenheit to 1050 degrees Fahrenheit as defined by ASTM D-86, and a cold crank viscosity (CCS) from 1200 centipoise to 5000 centipoise at minus 25 degrees Celsius and as defined by ASTM D-5293.

EXAMPLE 2

In embodiments, the system for producing an American Petroleum Institute Standards Group III Base Stock from vacuum gas oil, can be configured as follows with reference to the Figures: conduit 10 containing vacuum gas oil; a fresh hydrogen injector 26 injecting hydrogen and raising pressure in the conduit 10 to maintain between 1000 and 1500 psig; a recycle hydrogen injector 35 injecting recycle hydrogen at an elevated pressure and raising pressure to maintain pressure in the conduit 10 between 1000 and 1500 psig; a first heater 30 fluidly connected to the conduit 10 and to a first hydrogen reactor 32 for increasing the vacuum gas oil in temperature to 450 degrees F. while simultaneously saturating the heated vacuum gas oil through a plurality of hydrogen reactors connected in series having a liquid hourly space velocity (LHSV)$^{-1}$ through the hydrogen reactors of from 0.5 to 2.5, forming a saturated heated base oil, a coproduct and contaminants.

In this example, a second heater 40 fluidly connects to the first hydrogen reactor 32 and a second hydrogen reactor 42 for further increasing in temperature the vacuum gas oil; saturating the heated vacuum gas oil through a plurality of hydrogen reactors connected in series having a liquid hourly space velocity $(LHSV)^{-1}$ through the hydrogen reactors from 0.5 to 2.5 forming a saturated heated base oil, a coproduct and contaminants.

A third heater 50 fluidly connects to the second hydrogen reactor 42 and to a third hydrogen reactor 52 increasing the temperature of the vacuum gas oil to a third temperature of 600 degrees F. at a pressure between 1000 psig and 1500 psig.

A high pressure flash drum 60 connects to the third hydrogen reactor for separating contaminants from the saturated heated base oil 62 and coproduct 64 at a high pressure from 1000 psig to 1500 psig.

A recycle overhead 55 can be connected to the high pressure flash drum 60, receiving high pressure recycle hydrogen and contaminants separated from the saturated heated base oil in the high pressure flash drum.

A low pressure flash drum 70 connects to the high pressure flash drum, the low pressure flash drum 70 is used for decreasing the saturated heated base oil and coproduct pressure to between 40 to 60 psig.

A mixing conduit 75 receives a petroleum derived product 20 having a viscosity index greater than 120. The mixing conduit 75 receives the saturated heated base oil 62 and coproduct 64 combining with a petroleum derived product 20 having a viscosity index greater than 120, forming a saturated heated base oil mixture 77 with a combined boiling point range from 450 degrees F. to 1050 degree F. as defined by ASTM D-86.

A fractionation tower 90 a fractionation tower 90 receives contaminant free saturated heated base oil 82 and steam 108 to remove a light oil fraction 111 with an initial boiling point less than 600 degrees F. while simultaneously refluxing a cooled light oil fraction 111 during fractionating forming an American Petroleum Institute Standards Group III Base Stock with less than 0.03 percent sulfur, greater than 90 percent saturates and a viscosity index greater than 120 as defined by ASTM D-2270 and a viscosity range from 2 centistokes to 10 centistokes as defined by ASTM D-445 with a boiling range from 600 degrees Fahrenheit to 1050 degrees Fahrenheit as defined by ASTM D-86, and a cold crank viscosity (CCS) from 1200 centipoise to 5000 centipoise at minus 25 degrees Celsius and as defined by ASTM D-5293.

EXAMPLE 3

In embodiments, the system for producing an American Petroleum Institute Standards Group III Base Stock from vacuum gas oil, can be configured as follows with reference to the Figures: a conduit 10 containing vacuum gas oil; a fresh hydrogen injector 26 injecting hydrogen and raising pressure in the conduit 10 to maintain between 1000 psig and 1500 psig; a recycle hydrogen injector 35 injects recycled hydrogen at an elevated pressure and raises pressure to maintain pressure in the conduit 10 between 1000 psig and 1500 psig. A first heater 30 fluidly connected to the conduit 10 and to a first hydrogen reactor 32 for increasing the vacuum gas oil in temperature to 450 degrees Fahrenheit at a pressure between 1000 psig and 1500 psig; saturating the heated vacuum gas oil through a plurality of hydrogen reactors connected in series having a liquid hourly space velocity $(LHSV)^{-1}$ through the hydrogen reactors from 0.5 to 2.5, forming a saturated heated base oil, a coproduct and contaminants.

A second heater 40 fluidly connects to the first hydrogen reactor 32 and a second hydrogen reactor 42 for further increasing in temperature the saturated heated base oil, forming a heated saturated heated base oil, a coproduct, and contaminants.

A third heater 50 fluidly connects to the second hydrogen reactor 42 and to a third hydrogen reactor 52 increasing the temperature of the heated saturated heated base oil to a third temperature of 600 degrees Fahrenheit at a pressure between 1000 psig and 1500 psig.

A high pressure flash drum 60 connects to the third hydrogen reactor 52 for separating high pressure recycle hydrogen and contaminants from the saturated heated base oil 62 and coproduct 64 at a high pressure from 1000 psig to 1500 psig. A low pressure flash drum 70 connects to the high pressure flash drum, and is used for decreasing the heated saturated heated base oil and coproduct pressure to between 40 to 60 psig.

A fourth heater 80 fluidly connects to the low pressure flash drum 70 for heating the heated saturated heated base oil 62 and coproduct 64 forming a heated saturated base oil having a boiling point from 450 degrees Fahrenheit to 1050 degrees Fahrenheit as defined by ASTM D-86.

A fifth heater 85 can be used in this embodiment to preheat the petroleum derived product 20 having a viscosity index greater than 120 to a temperature between 400 and 600 degrees Fahrenheit.

A mixing conduit receives preheated petroleum derived product 20 and the heated saturated heated base oil 82 and coproduct 64 with a combined boiling point range from 450 degrees Fahrenheit to 1050 degrees Fahrenheit as defined by ASTM D-86.

In this embodiment, a fractionation tower 90 a fractionation tower 90 receives contaminant free saturated heated base oil 82 and steam 108 to remove a light oil fraction 111 with an initial boiling point less than 600 degrees F. while simultaneously refluxing a cooled light oil fraction during fractionating forming an American Petroleum Institute Standards Group III Base Stock with less than 0.03 percent sulfur, greater than 90 percent saturates and a viscosity index greater than 120 as defined by ASTM D-2270 and a viscosity range from 2 centistokes to 10 centistokes as defined by ASTM D-445 with a boiling range from 600 degrees Fahrenheit to 1050 degrees Fahrenheit, and a cold crank viscosity (CCS) from 1200 centipoise and 5000 centipoise at minus 25 degrees Celsius and as defined by ASTM D-5293.

In embodiments, the system for producing an American Petroleum Institute Standards Group III Base Stock from vacuum gas oil, can be configured as follows with reference to the Figures: conduit 10 containing vacuum gas oil; a fresh hydrogen injector 26 injecting hydrogen and raising pressure in the conduit 10 to maintain between 1200 and 1500 psig; a recycle hydrogen injector 35 injecting recycle hydrogen at an elevated pressure and raising pressure to maintain pressure in the conduit 10 between 1200 and 1500 psig; a first heater 30 fluidly connected to the conduit 10 and to a first hydrogen reactor 32 for increasing the vacuum gas oil in temperature to 450 degrees F. and 1200 psig while simultaneously saturating the heated vacuum gas oil through a plurality of hydrogen reactors connected in series having a liquid hourly space velocity $(LHSV)^{-1}$ through the hydrogen reactors of from 0.5 to 2.5, forming a saturated heated base oil, a coproduct and contaminates.

While these embodiments have been described with emphasis on the embodiments, it should be understood that within the scope of the appended claims, the embodiments might be practiced other than as specifically described herein.

What is claimed is:

1. A system for producing an American Petroleum Institute Standards Group Ill Base Stock from vacuum gas oil, comprising:
   a. a conduit receiving a petroleum derived product having a viscosity index greater than 120, the conduit receiving a vacuum gas oil forming a vacuum gas oil mixture with a combined boiling point range from 450 degrees Fahrenheit to 1050 degrees Fahrenheit as defined by ASTM D-86;
   b. a first heater fluidly connected to the conduit and to a first hydrogen reactor for increasing temperature of the vacuum gas oil mixture to a temperature from 50 degrees Fahrenheit to 600 degrees Fahrenheit, forming a heated vacuum gas oil mixture;
   c. a pump installed prior to the first heater, a fresh hydrogen injector and a recycle hydrogen injector simultaneously increasing pressure on the heated vacuum gas oil mixture from 50 psig to a pressure from 1000 psig and 1500 psig by injection of hydrogen wherein the fresh hydrogen injector comprises a nozzle that engages a flow control valve further in communication with a flow meter and a high pressure pump and a hydrogen vaporizer for receiving liquid hydrogen from a liquid hydrogen reservoir;
   d. a plurality of hydrogen reactors connected in series, having a liquid hourly space velocity $(LHSV)^{-1}$ through the hydrogen reactors from 0.5 to 2.5, for saturating the heated vacuum gas oil mixture forming a first partially saturated heated base oil then a fully saturated heated base oil with hydrogen from the second and third hydrogen reactors;
   e. a high pressure flash drum connected to the plurality of hydrogen reactors connected in series to separate a saturated heated base oil from a recycle overhead at a high pressure from 1000 psig to 1500 psig;
   f. a low pressure flash drum removing contaminants from the saturated heated base oil producing contaminant free saturated heated base oil;
   g. a fractionation tower receives contaminant free saturated heated base oil and steam to remove a light oil fraction with an initial boiling point less than 600 degrees F. while simultaneously refluxing, forming an API Standards Group Ill Base Stock with less than 0.03 percent sulfur, greater than 90 percent saturates and a viscosity index greater than 120 as defined by ASTM D-2270 and a viscosity range from 2 to 10 centistokes as defined by ASTM D-445 with a boiling range from 600 degrees Fahrenheit to 1050 degrees Fahrenheit as defined by ASTM D-86, and a cold crank viscosity (CCS) between 1200 and 5000 centipoise at minus 25 degrees C. and as defined by ASTM D-5293.

2. The system of claim 1, comprising a feed effluent heat exchanger to exchange energy from the American Petroleum Institute Standards Group III Base Stock is with the feedstock vacuum gas oil reducing temperature of the American Petroleum Institute Standards Group III base stock from 500 degrees Fahrenheit to 300 degrees Fahrenheit.

3. The system of claim 2, comprising a cooling water exchanger to receive warm American Petroleum Institute Standards Group III Base Stock from the feed effluent heat exchanger and reduces the temperature by 100 degrees Fahrenheit to 150 degrees Fahrenheit and then transfers the cooled American Petroleum Institute Standards Group III Base Stock to storage or transport.

4. The system of claim 1, comprising a metallic catalyst installed in each of the hydrogen reactors, wherein the metallic catalyst is selected from at least one of the group consisting of: cobalt, nickel, and molybdenum.

5. The system of claim 1, wherein the recycle hydrogen injector comprises:
   a. a recycle nozzle;
   b. a recycle flow meter connected to the recycle nozzle in series;
   c. a hydrogen compressor connected to the recycle flow meter;
   d. a second stage knockout drum separating contaminated water;
   e. a first stage knockout drum separating contaminated water and naptha;
   f. a water cooled exchanger;
   g. a high pressure wash water injector providing a psig from 1400 to 1600 psig receiving water; and
   h. a recycle overhead connected to the high pressure wash water injector.

* * * * *